March 23, 1937. S. O. WHITE ET AL 2,074,820
CLUTCH MECHANISM FOR AUTOMOBILE TRANSMISSIONS
Filed Aug. 11, 1930 2 Sheets-Sheet 2
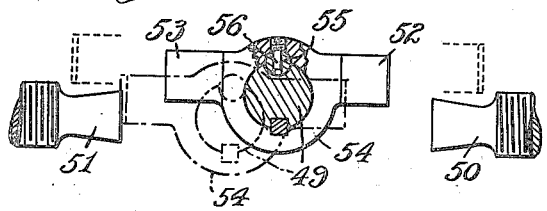
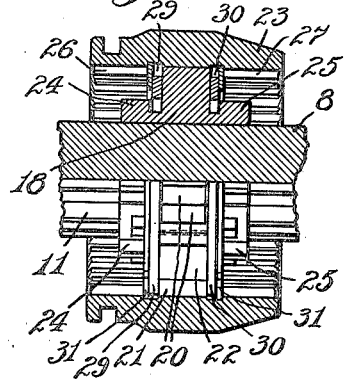
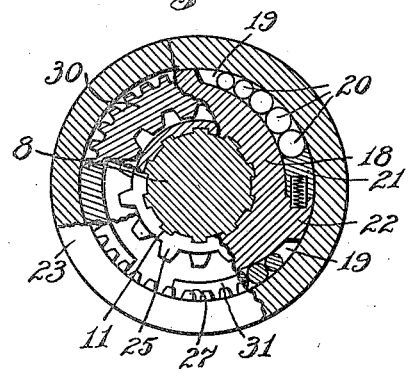
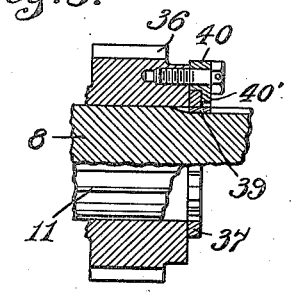
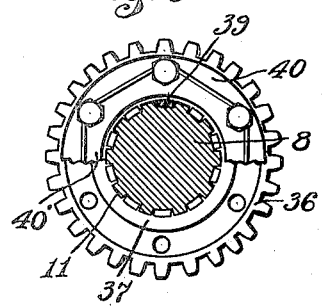
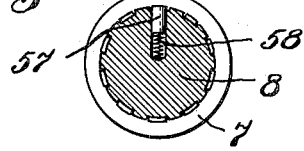
INVENTORS
Samuel O. White
and Otto E. Fishburn,
BY
Hood + Hahn.
ATTORNEYS Patented Mar. 23, 1937

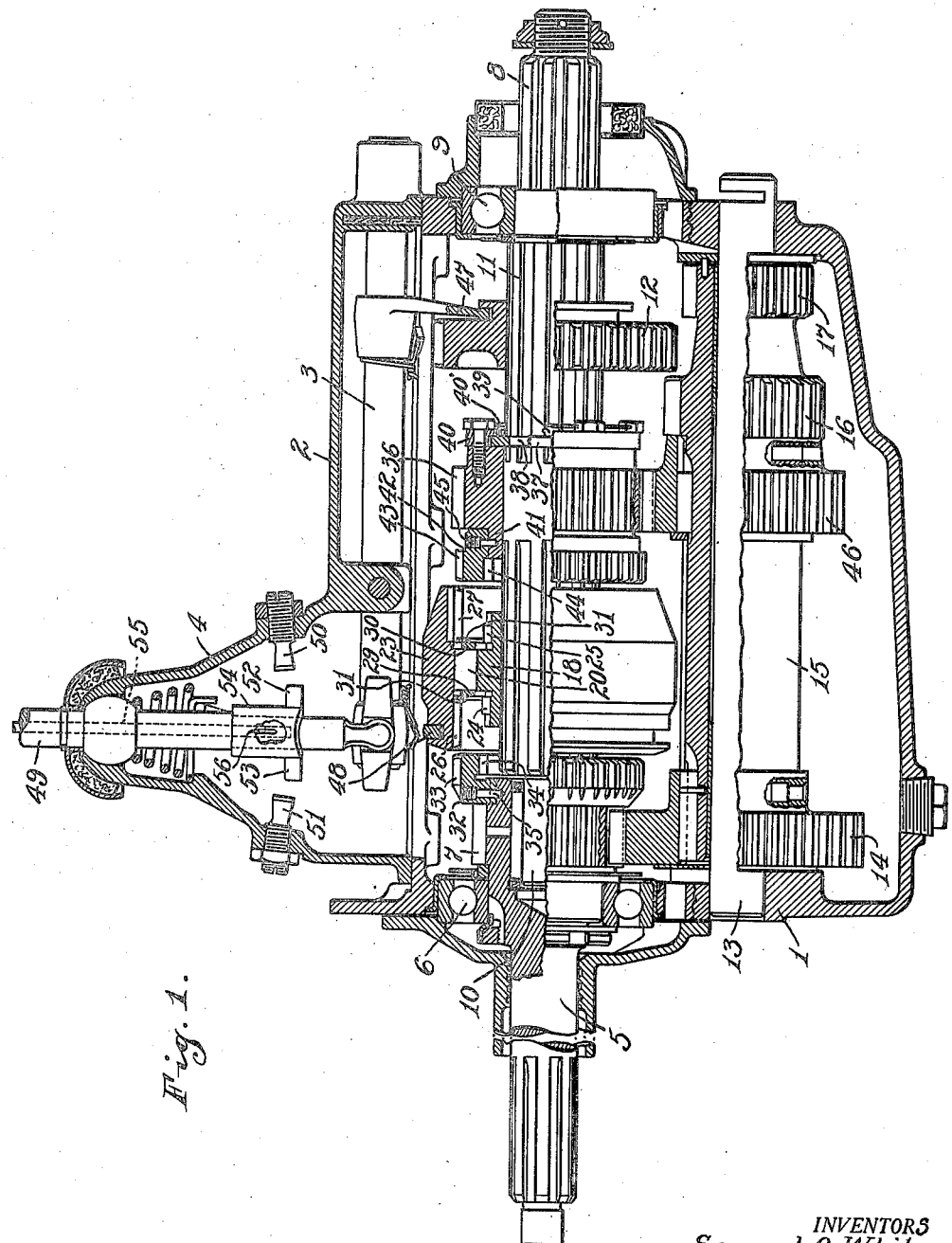

2,074,820

UNITED STATES PATENT OFFICE 2,074,820

CLUTCH MECHANISM FOR AUTOMOBILE TRANSMISSIONS

Samuel O. White and Otto E. Fishburn, Muncie, Ind., assignors, by mesne assignments, to Borg-Warner Corporation, Chicago, Ill., a corporation of Illinois Application August 11, 1930, Serial No. 474,366

6 Claims. (Cl. 74—370)

Our invention relates to improvements in overrunning clutch mechanism and the control thereof in transmissions particularly adapted for automobiles. One of the objects of our invention is the provision of an automobile transmission, which, when the vehicle is traveling faster than the engine, will disconnect the vehicle drive from the engine, but which will automatically connect the vehicle drive with the engine when the momentum speed of the vehicle becomes less than that of the engine and to provide means for controlling said transmission by means readily accessible to the operator.

Another object of our invention is the provision of means whereby this feature of "free wheeling" may be locked out or rendered inoperative whenever it becomes necessary or desirable.

Another object of our invention is the provision of a transmission having the above characteristics which may be economically manufactured, both from a manufacturing and an assembly standpoint.

For the purpose of disclosing our invention, we have illustrated one embodiment of the same in the accompanying drawings, in which:

Fig. 1 is a longitudinal sectional view of a transmission embodying our invention;

Fig. 2 is a more or less diagrammatic view showing the lock out control mechanism;

Fig. 3 is a detailed section of the overrunning clutch mechanism;

Fig. 4 is a detailed transverse section of the overrunning clutch mechanism;

Fig. 5 is a detailed section showing the means for securing one of the transmission gears in position;

Fig. 6 is a detailed transverse section showing the same feature, and

Fig. 7 is a sectional view of a modification of the structure shown in Figs. 5 and 6.

In the structure illustrated we provide the usual transmission casing 1 having a separable top 2. This top carries the shifter rods 3 and is provided with the usual truncated cone shaped dome 4.

The driving shaft 5, which is adapted to be connected with the engine through the usual friction clutch, extends through the front end of the casing and is mounted in suitable ball bearings 6. This shaft, within the casing, is provided with a driving pinion 7 either integrally formed on the shaft, as shown, or fastened thereon.

The driven shaft 8 extends through the opposite end of the casing, being supported in suitable ball bearings 9 and having its end 10 telescoping the drive shaft and suitable bearings therein. This driven shaft is provided with a splined portion 11 on which is splined an axially shiftable driven gear 12.

A lay shaft 13 is supported in the casing and this shaft is provided with a driven gear 14 mounted on a sleeve 15 surrounding the shaft 13 and meshing with and driven from the gear 7. The sleeve 15 is also provided with a gear 16 adapted to be meshed with the gear 12 and with a gear 17 adapted to mesh with an idler, not shown, for reverse purposes.

For providing for the "free wheeling" feature of the transmission, the driven shaft 8 has splined thereon a hub 18 provided with a plurality of roller receiving recesses 19 in its periphery, the recesses decreasing in depth and accommodating a series of rollers 20 gradually decreasing in diameter. These rollers abut against stop members 21, in turn abutting against shoulders 22 of the hub. An outer sleeve member 23 surrounds the hub and forms the second member of the overrunning clutch, the clutch being so constructed that when the hub 18 is driven at a greater speed than the sleeve 23, the two parts will be disconnected and when the load is imposed upon the sleeve 23 the clutch will become active. This hub 18 is provided with a series of clutch teeth 24 and with a series of clutch teeth 25, the purpose of which will appear more fully hereinafter. The sleeve member 23 is provided with a set of internal clutch teeth 26 and a second set of internal clutch teeth 27, the purpose of which will more fully appear hereinafter. For holding the rollers 20 in position and for assisting and insuring the movement thereof at the proper time, we provide a pair of side rings 29 and 30, which have their outer and inner peripheries notched to permit them to be slipped in position over the teeth 24, 26, and 25, 27. The sleeve 23 is provided with annular grooves adjacent the rings 29 and 30 and split rings 31 are snapped into these grooves after the rings have been assembled for the purpose of holding the rings in position. It will thus be seen by this arrangement the parts are assembled into a unitary structure which is axially movable on the shaft 8. The clutch teeth 26 and 27 overhang the clutch teeth 24 and 25 so that, when the structure is axially moved they will engage their corresponding teeth before the teeth 24 and 25 engage their corresponding teeth.

The drive shaft 5 is provided on its end with a clutch member 32 having outer clutch teeth 33 and inner clutch teeth 34 adapted to engage respectively with the teeth 26 and 24. This clutch member, in practice, is constructed as a separate unit from the shaft 5 in the form of a ring having internal teeth adapted to mesh with teeth on the shaft 5 and being locked in position on the shaft 5 by set screws 35. This construction is rather important from an assembly and construction standpoint, as it permits of the formation of the gear 7 on the shaft by a simple milling and cutting operation which would not be possible if the ring 32 were formed integrally on the shaft. The construction also permits of a more ready and easier cutting of the teeth 33 and 34.

A gear 36 is rotatably mounted on the shaft 8 but is held against axial displacement thereon. To this end I provide a thrust ring 37 having internal teeth to coincide with the splines 11 on the shaft 8, whereby the ring may be slipped over the shaft. These teeth, however, are adapted to fit in an annular groove 38 in the shaft and after the ring has been slipped into position over the splines it is given a slight turn to bring the teeth opposite the splines and is then locked into position by means of a suitable key 39. The ring is thus held against axial displacement on the shaft. The gear 36 is provided with an annular ring 40 having an overhanging portion 40' which engages on one side of the ring 37, the opposite face of the ring being adapted to abut against the face of the gear 36. This maintains the gear 36 against axial displacement in either direction.

On the hub portion 41 of the gear 36 is mounted a clutch ring 42 having clutch teeth 43 adapted to be meshed with the clutch teeth 27 and teeth 44 adapted to be meshed with the clutch teeth 25. This ring, like the ring 32, is made separate from the gear 36 and is provided with teeth meshing with teeth on the hub member 41, being locked on the hub by means of the pins 45. This arrangement also permits of the ready cutting of the teeth of the gear 36 and the cutting of the teeth on the ring, which process can be much more economically performed when the two parts are separate than if they were made in a single integral structure.

The gear 36 is adapted to be in constant mesh with a gear 46 on the sleeve 15 and constitutes the second speed drive for the shaft 8.

The operation of the device so far described is as follows: With the parts in the position illustrated the transmission is in neutral. In order to shift into first or low speed the gear 12 is shifted into engagement with the gear 16 and due to the fact that the sleeve 15 is driven from the constant mesh of gears 7 and 14 the driven shaft 8 will be rotated at low speed. For the next higher speed the sleeve member 23 is shifted to the right, looking at Fig. 1, until the clutch teeth 27 mesh with the clutch teeth 43. This connects the gear 36 with the shaft 8 through the overrunning clutch. And the driven shaft 8 is driven at its second speed through the overrunning clutch, the arrangement being such, however, that if the speed of the shaft 8 becomes greater than the speed of the shaft 5, the shaft 8 will be disconected from the shaft 5. By shifting the sleeve 23 to the left, looking at Fig. 1, until the teeth 26 mesh with the teeth 33, the two shafts 8 and 5 will be directly conected through the overrunning clutch. If the sleeve 23 is shifted to the limit of its right hand movement the teeth 25 will mesh with the teeth 44 thereby rendering the overrunning clutch inoperative and connecting the gear 36 directly to the shaft 8 and if the sleeve 23 is shifted to the limit of its movement to the left to engage the teeth 24 with the teeth 34, the two shafts will be directly connected rendering the overrunning clutch inactive. By this construction it will be noted that the free wheeling feature is embodied both in the direct and second speed drive although if desired it may be eliminated from both when occasion demands.

The gear 12 is shifted by means of a shifter fork 47 operated from one of the shifter rods 3 and the sleeve 23 is shifted by means of a shifter fork 48 on one of the shifter rods 3. These rods are shifted by the usual shift lever 49 mounted in the dome 4 in the usual manner. In order, however, to prevent the movement of the lever 49, in shifting the sleeve 23, beyond the normal limits wherein the overrunning clutch is in operative relation, we provide a pair of limit stops 50 and 51 which are mounted in the dome 4 and which are preferably screw threaded therein for the purpose of adjustment. These stops are adapted to be engaged by lugs 52 and 53 on a sleeve 54 surrounding the shifter lever 49 and normally in position to engage the stops. The sleeve, however, may be depressed if it is desired to "lock out" the overrrunning clutch. And to this end the sleeve is connected to an operating rod 55 mounted in a recess extending longitudinally of the shift lever. This rod is provided with a pin 56 engaging the sleeve so that the manipulation of the rod will also manipulate the sleeve. Therefore, if it is desired to "lock out" the overrunning clutch, it is only necessary to depress the rod 55 so that the lugs 52 and 53 will pass beneath the stops 50 and 51. This permits the shifting of the sleeve 23 so that the clutch teeth 24 and 25 may be respectively engaged with the clutch teeth 34 and 44. It will be noted from Fig. 2 that the stops 50 and 51 are so positioned that when the shift lever is shifted in the position to manipulate the gear 12 the lugs 52 and 53 will clear these stops.

In Fig. 7 we have shown a modified form of means for holding the ring 37 against rotation.

In this structure instead of providing the key 39 we provide a plunger 57 in a recess in the shaft 8 and biased outwardly by a spring 58 so that it will engage between the teeth of the ring and prevent rotation thereof.

We claim the following:

1. In a transmission, the combination with a driving shaft and a driven shaft, of an overrunning clutch for connecting said shafts comprising a hub member and a sleeve member, one of said members having a recess therein, the bottom of which is eccentric to the other member, wedging members in said recess, said hub member having outer peripheral teeth and the sleeve member having inner peripheral teeth, retaining rings for said wedging members having notches to accommodate said teeth and means for engaging one of said members for retaining said rings in place.

2. In a transmission, the combination with a driving shaft and a driven shaft, of an overrunning clutch for connecting said shafts comprising a hub member and a sleeve member, one of said members having a recess therein the bottom of which is eccentric to the other member, wedging members in said recess, said hub member having outer peripheral teeth thereon and the sleeve member having inner peripheral teeth, retaining rings for said wedging members having notches to accommodate said teeth and split rings fitting in annular grooves in one of said members for retaining the rings in place.

3. In a transmission, the combination with a driving shaft and a driven shaft, of a gear train for drivingly connecting said shafts, an overrunning clutch carried by said driven shaft, means associated with said driving shaft and said clutch for drivingly connecting said shafts through said overrunning clutch, means associated with said clutch and said gear train for drivingly connecting said gear train through said overrunning clutch to the driven shaft, a pair of two-way clutches carried by said driven shaft for drivingly connecting said driving and driven shafts and said gear train and driven shaft for rendering said overrunning clutch inoperative, a single shift lever for selectively operating said connecting means and two-way clutches and means for normally rendering said shift lever inactive with respect to said two-way clutches.

4. In a transmission, the combination with a drive shaft and a driven shaft, of a gear rotatably mounted on said driven shaft means cooperating with said gear for drivingly connecting said driving and driven shafts, an overrunning clutch mounted on said driven shaft independently of said gear and axially shiftable thereon, means carried by one member of said overrunning clutch for connecting said drive and driven shafts through the said overrunning clutch and means carried by the other member of said overrunning clutch, for positively connecting said drive and driven shafts to render said overrunning clutch inoperative, a single shift lever for axially shifting said overrunning clutch and means for normally rendering said shift lever ineffective with respect to said second mentioned means.

5. In a transmission, the combination with a driving shaft and a driven shaft, of a gear rotatably mounted on said driven shaft, an overrunning clutch mounted on said driven shaft independently of said gear and axially shiftable thereon, means on one member of said overrunning clutch for either connecting said member to the driving shaft or to the gear, means on the other member of the overrunning clutch for either positively connecting said driving and driven shafts, or said gear and driven shaft, a single shift lever for selectively operating said means and means for normally rendering said shift lever ineffective with respect to said positively connecting means.

6. In a transmission, a driving shaft, a driven shaft in axial alignment therewith, a gear rotatably mounted on said driven shaft and drivingly connected with said driven shaft, clutch members carried by said driving shaft, clutch members carried by said gear, a movable clutch assembly disposed between said driving shaft and said gear and including two concentric members, the inner of said members being splined to said driven shaft, the outer of said members being in overrunning drive relationship with the inner member, each of said clutch assembly members having clutch portions at opposite ends adapted for engagement with the clutch members on said driving shaft and said gear respectively, the clutch portions of the said outer member extending longitudinally in advance of the clutch portions on said inner member, a lever for bodily shifting said movable clutch assembly in the direction of the driving shaft or gear clutch members at will progressively to clutch therewith first the outer clutch assembly member and thereafter the inner clutch assembly member, and operator-controlled means for limiting the movement of said clutch assembly by said lever to clutch engagement through the said outer clutch assembly member only.

SAMUEL O. WHITE.
OTTO E. FISHBURN.